June 8, 1937.　　　　R. D. KELLY　　　　2,082,835
CIRCUIT CLOSER
Filed May 5, 1936
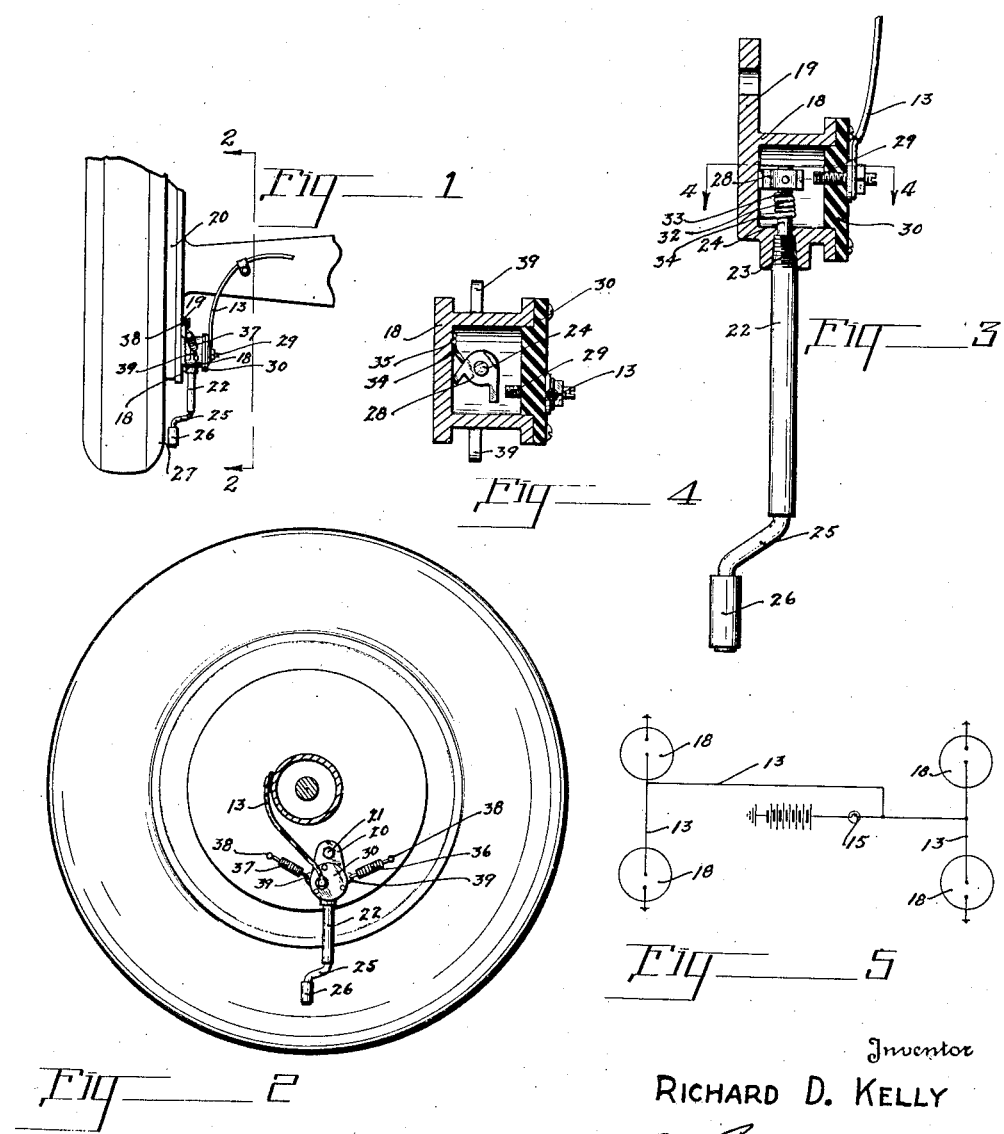
Inventor
RICHARD D. KELLY
By
Attorney Patented June 8, 1937

2,082,835

UNITED STATES PATENT OFFICE 2,082,835

CIRCUIT CLOSER

Richard D. Kelly, The Dalles, Oreg.

Application May 5, 1936, Serial No. 78,017

5 Claims. (Cl. 200—58)

My invention relates to warning signals and is particularly adapted for warning the driver of motor vehicles when the pressure carried in pneumatic tires is getting low.

The primary object of the invention is to indicate to the driver of a motor vehicle when any of the pneumatic tires are getting low on air.

Another object of the invention is to provide a signal for warning the driver of a motor vehicle of the conditions of his tires by the use of a simple attachable mechanism, having few parts and easy to install.

Other and incidental objects will be apparent in the drawing, specification and claims to follow.

Figure 1 is the rear view of an axle, wheel and tire, having a preferred form of contact mechanism secured thereto.

Figure 2 is the side view of a wheel and tire, taken on line 2—2 of Figure 1, looking in the direction indicated, having one of the contacts pivotally mounted thereon.

Figure 3 is a sectional view of the contact mechanism shown in Figures 1 and 2.

Figure 4 is a sectional end view taken on line 4—4 of Figure 3 looking in the direction indicated.

Figure 5 is a diagrammatical lay-out of the contact mechanism attached to each wheel, illustrating the electric hook-up leading to the signal within the vehicle.

The invention as illustrated includes a housing 18, having a right angle lug 19 for holding the same to the brake drum 20, which housing is pivotally mounted to the drum by the fastening bolt 21. Extending downwardly from the housing 18 is a hollow tube 22, threaded into the housing at 23. A shaft 24 extends down through the tube 22, terminating in a crank 25, it may or may not have a roller 26 for contacting the tire at 27. The upper end of the shaft 24 has a contact arm 28 for contacting the contact point 29 which is adjustably mounted within the insulation cap 30. When this contact is completed by the bulging of the tire at 27, contacting the roller 26 and revolving the shaft 24, it will in turn close the circuit 13 through the indicating means 15. A spring 32, having its one end fixed to the shaft 22 at 33 and its opposite end 34 bearing against the inner wall of the housing 18 at 35 holds the contact arm 28 away from the contact point 29 under normal conditions.

In order to prevent damage to the contact mechanism a shoulder bolt 21 permits the mechanism to pivot, the same being held in a vertical position as shown in Figure 2 by the action of the springs 36 and 37, both being anchored to the housing 20 by suitable anchorages 38, having their opposite ends hooked into the lugs 39 of the housing 18. This will permit the switch mechanism to oscillate when obstructions are encountered.

While I have shown a suitable mechanism for carrying out the spirit of the invention, namely, the bulging of the tire due to low air pressure co-acting with a contact point, completing an electric signal, I do not wish to be limited to this form of construction as other means may be employed still coming within the scope of the claims to follow.

What is claimed to be new is:

1. A tire deflation alarm including a casing swingingly supported by a part of the vehicle, a contact carried by and insulated from the casing, a tube carried by and depending from the casing, an arm mounted for rotation in the tube and extending above and below the same, the lower end of the arm being laterally deflected to permit it to be engaged by the bulging wall of a tire when deflated to rotate the arm in the tube, and a contact carried by the upper end of the arm within the casing and adapted to electrically engage the first-mentioned contact under predetermined rotation of the arm, said contacts controlling an alarm circuit.

2. A construction as defined in claim 1, wherein the casing-carried contact is adjustable to vary the extent of arm movement necessary to cause contact engagement.

3. A construction as defined in claim 1, including a spring for maintaining the arm in normal position in the absence of tire contact therewith.

4. A construction as defined in claim 1, including a spring for maintaining the arm in normal position, the contact carried by the arm being formed to provide a stop to engage the housing and limit the normal position of the arm under the influence of the spring.

5. A construction as defined in claim 1, including means to maintain the swinging housing in a normal position without interfering with the swing of the housing in the presence of an obstruction in the path of the free end of the arm.

RICHARD D. KELLY.